(12) United States Patent
Takahagi et al.

(10) Patent No.: US 9,520,581 B2
(45) Date of Patent: Dec. 13, 2016

(54) PACKAGING MATERIAL FOR CELL (71) Applicant: DAI NIPPON PRINTING CO., LTD., Tokyo (JP)

(72) Inventors: Atsuko Takahagi, Fukuoka (JP); Hirohisa Akita, Fukuoka (JP); Sumito Nishida, Fukuoka (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/405,524

(22) PCT Filed: May 29, 2013

(86) PCT No.: PCT/JP2013/064859
§ 371 (c)(1),
(2) Date: Dec. 4, 2014

(87) PCT Pub. No.: WO2013/183511
PCT Pub. Date: Dec. 12, 2013

(65) Prior Publication Data
US 2015/0155531 A1 Jun. 4, 2015

(30) Foreign Application Priority Data
Jun. 4, 2012 (JP) .................................. 2012-127344

(51) Int. Cl.
*H01M 2/02* (2006.01)
*B32B 15/08* (2006.01)
(Continued)

(52) U.S. Cl.
CPC .............. *H01M 2/0287* (2013.01); *B32B 7/12* (2013.01); *B32B 15/08* (2013.01); *B32B 15/20* (2013.01);
(Continued)

(58) Field of Classification Search
None
See application file for complete search history.

(56) References Cited

U.S. PATENT DOCUMENTS

2004/0142190 A1    7/2004   Kawai et al.
2008/0241663 A1*  10/2008   Yamashita ............ H01M 2/021
                                                        429/122
(Continued)

FOREIGN PATENT DOCUMENTS

CN    1475037 A    2/2004
JP    11-214856 A  8/1999
(Continued)

OTHER PUBLICATIONS

JP 2004319414 A Machine translation (Nov. 2004).*
(Continued)

*Primary Examiner* — Carlos Barcena
*Assistant Examiner* — Wojciech Haske
(74) *Attorney, Agent, or Firm* — Oliff PLC (57) ABSTRACT

A packaging material for a cell including a layered film in which at least a base-material layer, an adhesive layer, a metallic layer, and a sealant layer are layered in the stated order. The packaging material for a cell including a layered body in which at least a base-material layer, an adhesive layer, a metallic layer, and a sealant layer are layered in the stated order, wherein the packaging material for a cell can be imparted with highly exceptional moldability, and dramatically less prone to pinholing and cracking during molding by using, as the metallic layer, an aluminum foil having 0.2% yield strength of 58-121 N/mm² when a tensile test is performed in the direction parallel to the rolling direction.

16 Claims, 1 Drawing Sheet (51) Int. Cl.
  *B32B 7/12* (2006.01)
  *B32B 15/20* (2006.01)
  *B32B 27/34* (2006.01)

(52) U.S. Cl.
  CPC .............. *B32B 27/34* (2013.01); *H01M 2/026* (2013.01); *H01M 2/0262* (2013.01); *B32B 2307/518* (2013.01); *B32B 2307/54* (2013.01); *B32B 2457/10* (2013.01); *B32B 2553/00* (2013.01); *H01M 2220/20* (2013.01); *H01M 2220/30* (2013.01)

(56) References Cited

U.S. PATENT DOCUMENTS

2008/0286635 A1 11/2008 Seino et al.
2010/0227213 A1* 9/2010 Hata .............................. 429/163

FOREIGN PATENT DOCUMENTS

| JP | 2000-123800 A | 4/2000 |
| JP | 2001-176459 A | 6/2001 |
| JP | 2002-187233 A | 7/2002 |
| JP | 2004319414 A * | 11/2004 |
| JP | 2005-163077 A | 6/2005 |
| JP | 2006-236938 A | 9/2006 |
| JP | 2008-053133 A | 3/2008 |
| JP | 2008-127656 A | 6/2008 |
| JP | 2008-287971 A | 11/2008 |
| JP | 2011-076735 A | 4/2011 |
| JP | 2011-108450 A | 6/2011 |
| WO | 2012/036181 A1 | 3/2012 |

OTHER PUBLICATIONS

Jul. 2, 2013 International Search Report issued in International Application No. PCT/JP2013/064859.
Dec. 9, 2014 International Preliminary Report on Patentability issued in International Application No. PCT/JP2013/064859.
Apr. 24, 2015 Office Action Issued in Chinese Patent Application No. 201380029612.7.
"Research related to mechanical properties of 8006 aluminum alloys at high temperature", by School of Materials Science and Engineering, Southwest University and Southwest Aluminum (Group) Co., Ltd., issued on Jul. 28, 2010.
Sep. 9, 2015 Search Report issued in European Application No. 13800865.1.
Ota, Akira. "Press Processing Engineering Manual". Published by Nikkan Kogyo Shimbun, Ltd., issued Jul. 30, 1981, pp. 1-3.

* cited by examiner

PACKAGING MATERIAL FOR CELL

TECHNICAL FIELD

The present invention relates to a packaging material for a cell which has excellent moldability with pinholes and cracks hardly generated during molding.

BACKGROUND ART

Various types of cells have been heretofore developed, and in every cell, a packaging material is a member that is absolutely necessary for sealing cell elements such as an electrode and an electrolyte. Metallic packaging materials have been often used heretofore as packagings for cells.

On the other hand, in recent years, cells have been required to be diversified in shape, and desired to be thinner and lighter as performance of electric cars, hybrid electric cars, personal computers, cameras and mobile phones has been enhanced. However, metallic packaging materials for cells that have been often used heretofore have the disadvantage that it is difficult to keep up with diversification of shapes, and there is a limit to weight reduction.

Thus, in recent years, a film-shaped laminate with a base material, a metal layer and a sealant layer laminated in this order has been proposed as a packaging material for a cell which is easily processed into diversified shapes and is capable of achieving thickness reduction and weight reduction. However, such a film-shaped packaging material is thinner than a metallic packaging material, and thus has the disadvantage that pinholes and cracks are easily generated during molding. When pinholes and cracks are generated in a packaging material for a cell, an electrolyte solution may permeate a metal layer to form a metal precipitate, resulting in occurrence of a short-circuit, and therefore it is absolutely necessary that a film-shaped packaging material for a cell be made to have such a characteristic that pinholes are hardly generated during molding, i.e. excellent moldability.

Various studies focusing on an adhesive layer for bonding a metal layer have been conducted heretofore in order to improve moldability of a film-shaped packaging material for a cell. For example, Patent Document 1 discloses a laminated packaging material including an inner layer composed of a resin film, a first adhesive layer, a metal layer, a second adhesive layer and an outer layer composed of a resin film, wherein at least one of the first adhesive layer and the second adhesive layer is formed from an adhesive composition containing a resin having an active hydrogen group on the side chain, a polyfunctional isocyanate and a polyfunctional amine compound, so that reliability of the packaging material for deeper molding is improved.

As exemplified by Patent Document 1, many studies have been conducted heretofore on techniques for improving moldability focusing on blended components of an adhesive layer for bonding a metal layer to other layers in a packaging material for a cell which is composed of a film-shaped laminate. However, there has hardly been reported on techniques for enhancing moldability by focusing on the physical properties of the metal layer.

Generally, a metal material having a low yield strength and a high tensile strength is known to have excellent processability such that the material is easily deformed, and hardly creased in deep drawing (see Non-Patent Document 1), and a metal material having a low yield strength has also been generally employed heretofore as a metal layer in a packaging material for a cell which includes a film-shaped laminate.

PRIOR ART DOCUMENTS

Patent Document

Patent Document 1: Patent Document 1: Japanese Patent Laid-open Publication No. 2008-287971

Non-Patent Document

Non-Patent Document 1: Akira OTA, "Press Processing Engineering Manual", published by NIKKAN KOGYO SHIMBUN, LTD., issued on 30 Jul., 1981, pages 1 to 3

SUMMARY OF THE INVENTION

Problems to be Solved by the Invention

An object of the present invention is to provide a technique for resisting generation of cracks and pinholes during molding and imparting excellent moldability in a packaging material for a cell which includes a film-shaped laminate with at least a base material layer, an adhesive layer, a metal layer and a sealant layer laminated in this order.

Means for Solving the Problem

The present inventors have extensively conducted studies for solving the above-mentioned problems, and resultantly found that although it is considered that processability of an aluminum foil to be used for a metal layer is excellent as its yield strength is low in conventional techniques, a packaging material for a cell in which an aluminum foil having a high yield strength with the 0.2% yield strength being 58 to 121 N/mm$^2$ when a tensile test is conducted in a parallel direction with respect to a rolling direction is used for a metal layer surprisingly can exhibit exceptionally excellent moldability, so that the incidence of pinholes and cracks during molding can be considerably reduced. Further, when as a base material on which the aluminum foil is laminated, a nylon film having specific physical properties is used, moldability is exceptionally improved, so that generation of pinholes and cracks during molding can be further effectively suppressed. The present invention has been completed by further conducting studies based on the above-mentioned findings.

That is, the present invention provides a packaging material for a cell and a cell, which have the following aspects.
Item 1. A packaging material for a cell including a laminate with at least a base material layer, an adhesive layer, a metal layer and a sealant layer laminated in this order, wherein the metal layer is an aluminum foil having a 0.2% yield strength of 58 to 121 N/mm$^2$ when a tensile test is conducted in a parallel direction with respect to a rolling direction.
Item 2. The packaging material for a cell according to item 1, wherein the base material layer is a biaxially stretched nylon film that satisfies the following physical properties (i) and (ii):
(i) the elongation in the width direction ($EL_{TD}$) is 80 to 120%, and the ratio of the elongation in the flow direction ($EL_{MD}$) to the elongation in the width direction ($EL_{TD}$) ($EL_{MD}/EL_{TD}$) is 1 to 1.25; and
(ii) the tensile strength in the perpendicular direction ($TS_{TD}$) is 280 MPa or more, and the ratio of the tensile strength in the flow direction ($TS_{MD}$) to the tensile strength in the perpendicular direction ($TS_{TD}$) ($TS_{MD}/TS_{TD}$) is 0.75 to 1.

Item 3. The packaging material for a cell according to item 1 or 2, wherein the aluminum foil satisfies a 0.2% yield strength of 50 to 130 N/mm² when a tensile test is conducted in a perpendicular direction and a 45° direction with respect to a rolling direction.

Item 4. The packaging material for a cell according to any one of items 1 to 3, wherein the aluminum foil satisfies a tensile rupture strength of 90 to 130 N/mm² when a tensile test is conducted in a parallel direction with respect to a rolling direction.

Item 5. The packaging material for a cell according to any one of items 1 to 4, wherein at least one of the surfaces of the metal layer is subjected to a chemical conversion treatment.

Item 6. The packaging material for a cell according to any one of items 1 to 5, wherein the packaging material is a packaging material for a secondary battery.

Item 7. A cell, wherein a cell element including at least a positive electrode, a negative electrode and an electrolyte is stored in the packaging material for a cell according to any one of items 1 to 6.

Item 8. A method for producing a cell, the method including:
a step of storing a cell element including at least a positive electrode, a negative electrode and an electrolyte in the packaging material for a cell, wherein the packaging material for a cell includes a laminate with at least a base material layer, an adhesive layer, a metal layer and a sealant layer laminated in this order, the metal layer being an aluminum foil having a 0.2% yield strength of 58 to 121 N/mm² when a tensile test is conducted in a parallel direction with respect to a rolling direction.

Item 9. Use of a packaging material for production of a cell, wherein the packaging material includes a laminate with at least a base material layer, an adhesive layer, a metal layer and a sealant layer laminated in this order, the metal layer being an aluminum foil having a 0.2% yield strength of 58 to 121 N/mm² when a tensile test is conducted in a parallel direction with respect to a rolling direction.

Advantages of the Invention

According to a packaging material for a cell according to the present invention, a metal layer can moderately conform to the shape of a mold during molding, so that generation of pinholes, cracks and the like can be suppressed. Thus, the packaging material for a cell according to the present invention has excellent moldability, and can therefore contribute to improvement of productivity.

EMBODIMENTS OF THE INVENTION

A packaging material for a cell according to the present invention includes a laminate with at least a base material layer, an adhesive layer, a metal layer and a sealant layer laminated in this order, the metal layer being an aluminum foil having a 0.2% yield strength of 58 to 121 N/mm² when a tensile test is conducted in a parallel direction with respect to a rolling direction. Hereinafter, the packaging material for a cell according to the present invention will be described in detail.

1. Laminated Structure of Packaging Material for Cell

Figure 1:
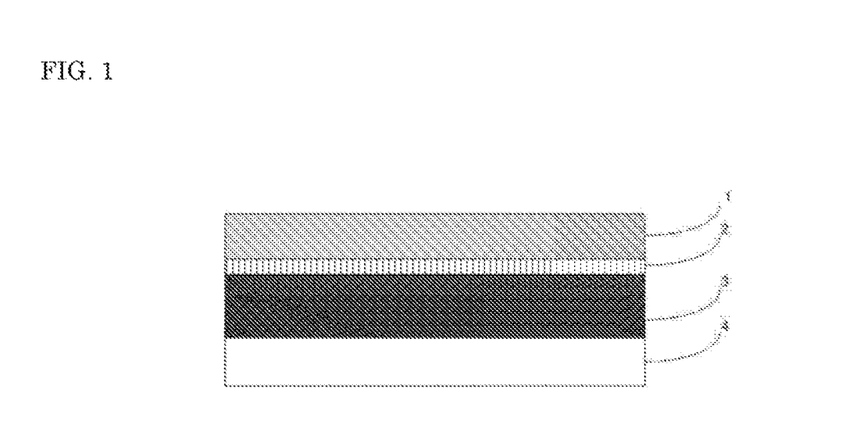
FIG. 1 is a view showing one example of a cross-sectional structure of a packaging material for a cell according to the present invention.

The packaging material for a cell includes a laminate with at least a base material layer 1, an adhesive layer 2, a metal layer 3 and a sealant layer 4 laminated in this order as shown in FIG. 1. In the packaging material for a cell according to the present invention, the base material layer 1 is an outermost layer, and the sealant layer 4 is an innermost layer. That is, at the time of assembling a cell, the sealant layer 4 situated on the periphery of a cell element is heat-sealed with itself to hermetically seal the cell element, so that the cell element is encapsulated.

Figure 2:
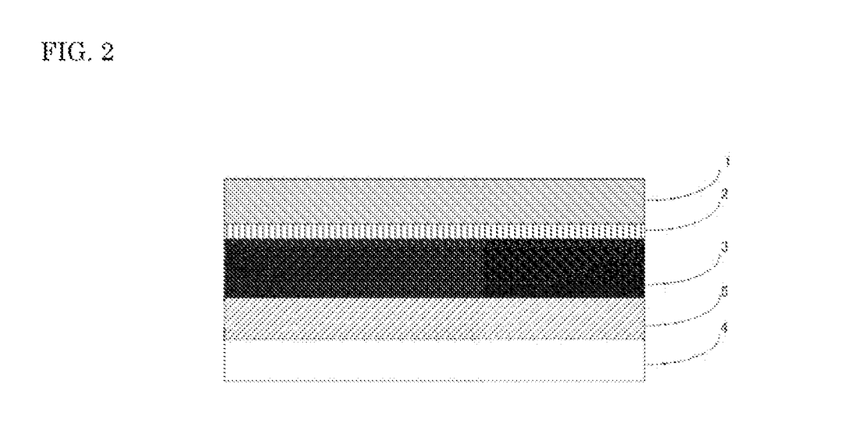
FIG. 2 is a view showing one example of a cross-sectional structure of a packaging material for a cell according to the present invention.

As shown in FIG. 2, the packaging material for a cell may be provided with an adhesive layer 5 between the metal layer 3 and the sealant layer 4 as necessary in order to improve adhesion of these layers.

2. Composition of Each Layer Forming Packaging Material for Cell

[Base Material Layer 1]

In the packaging material for a cell according to the present invention, the base material layer 1 is a layer forming an outermost layer. The material that forms the base material layer 1 is not particularly limited as long as it has insulation quality. Examples of the material that forms the base material layer 1 include polyester resins, polyamide resins, epoxy resins, acrylic resins, fluororesins, polyurethane resins, silicon resins, phenol resins, and resin films of a mixture and a copolymer etc. thereof. Specific examples of the polyester resin include polyethylene terephthalate, polybutylene terephthalate, polyethylene naphthalate, polybutylene naphthalate, copolymerized polyester and polycarbonate. Specific examples of the polyamide resin include nylon 6, nylon 6,6, copolymers of nylon 6 and nylon 6,6, nylon 6,10 and polymethaxylylene adipamide (MXD6). Among them, nylons and polyesters are preferred, and biaxially stretched nylons and biaxially stretched polyesters are further preferred, with biaxially stretched nylons being especially preferred.

Among the biaxially stretched nylon films, when those that satisfy the following physical properties (i) and (ii) are used, stress concentration due to uneven deformation that occurs during molding in the packaging material for a cell according to the present invention can be further effectively suppressed to improve the action of making deformation even, so that generation of pinholes and cracks during molding can be further effectively suppressed to exceptionally improve moldability.

(i) The elongation in the perpendicular direction (TD) ($EL_{TD}$) is 80 to 120%, and the ratio of the elongation in the flow direction (MD) ($EL_{MD}$) to the elongation in the perpendicular direction (TD) ($EL_{TD}$) ($EL_{MD}/EL_{TD}$) is 1 to 1.25.

(ii) The tensile strength in the perpendicular direction (TD) ($TS_{TD}$) is 280 MPa or more, and the ratio of the tensile strength in the flow direction (MD) ($TS_{MD}$) to the tensile strength in the perpendicular direction (TD) ($TS_{TD}$) ($TS_{MD}/TS_{TD}$) is 0.75 to 1.

In the physical property (i), the elongation ($EL_{TD}$) is preferably 90 to 110%, further preferably 95 to 100%. The ratio ($EL_{MD}/EL_{TD}$) is preferably 1.0 to 1.25, further preferably 1.0 to 1.2.

In the physical property (ii), the tensile strength ($TS_{TD}$) is preferably 280 to 370 MPa, further preferably 290 to 350 MPa. The ratio ($TS_{MD}/TS_{TD}$) is preferably 0.8 to 1.0, further preferably 0.9 to 1.0.

The elongation ($EL_{TD}$), the elongation ($EL_{MD}$), the tensile strength ($TS_{TD}$) and the tensile strength ($TS_{MD}$) defined in the physical properties (i) and (ii) are values measured by a tensile test set at a sample width of 15 mm, a gauge length of 100 mm and a tension speed of 500 mm/min.

Biaxially stretched nylon films having the physical properties (i) and (ii) are publicly known, and methods for production thereof are also publicly known. Specifically, a biaxially stretched nylon film having these physical properties can be obtained by, for example, biaxially stretching an unstretched raw film composed of a raw material including a nylon under such conditions that the draw ratio in each of the flow direction (MD) and the perpendicular direction (TD) is 3.0 to 3.5, and then heat-treating the film at 150 to 200° C. As a biaxial stretching method, simultaneous biaxial stretching or sequential biaxial stretching by a tubular method or a tenter method can be employed, but simultaneous biaxial stretching by a tubular method is preferred.

The base material layer 1 may be formed of one layer of resin film, but may be formed of two or more layers of resin film for improving pinhole resistance and insulation quality. When the base material layer 1 is formed of a multiple layers of resin film, two or more resin films may be laminated with an adhesive interposed therebetween, and the type and amount etc. of the adhesive used are similar to those in the later-described adhesive layer 2 or adhesive layer 5.

The thickness of the base material layer 1 is, for example, 10 to 50 μm, preferably 15 to 30 μm.

[Adhesive Layer 2]

In the packaging material for a cell according to the present invention, the adhesive layer 2 is a layer provided between the base material layer 1 and the metal layer 3 for strongly bonding these layers.

The adhesive layer 2 is formed from an adhesive capable of bonding the base material layer 1 and the metal layer 3. The adhesive used for forming the adhesive layer 2 may be a two-liquid curable adhesive, or may be a one-liquid curable adhesive. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesives; (meth) acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

The thickness of the base material layer 2 is, for example, 1 to 10 μm, preferably 2 to 5 μm.

[Metal Layer 3]

In the packaging material for a cell according to the present invention, the metal layer 3 is a layer which is intended to improve the strength of the packaging material, and also functions as a barrier layer for preventing ingress of water vapor, oxygen, light and the like into the cell. In the packaging material for a cell according to the present invention, the metal layer 3 is formed from an aluminum foil having a 0.2% yield strength of 58 to 121 N/mm² when a tensile test is conducted in a parallel direction with respect to a rolling direction. By using as the metal layer 3 an aluminum foil having a high yield strength as mentioned above, excellent moldability can be imparted to the packaging material for a cell according to the present invention.

While it suffices that the aluminum foil used as the metal layer 3 satisfies a 0.2% yield strength of 58 to 121 N/mm² when a tensile test is conducted in a parallel direction (MD) with respect to a rolling direction, the 0.2% yield strength is preferably 64 to 85 N/mm² for imparting further excellent moldability.

While in the aluminum foil, the 0.2% yield strength when a tensile test is conducted in a perpendicular direction (TD) and a 45° direction with respect to a rolling direction is not particularly limited, the 0.2% yield strength is, for example, 50 to 130 N/mm², preferably 60 to 90 N/mm², further preferably 65 to 85 N/mm².

In the aluminum foil, the tensile rupture strength when a tensile test is conducted in a parallel direction (MD) with respect to a rolling direction is, for example, 90 to 130 N/mm², preferably 95 to 125 N/mm², further preferably 100 to 110 N/mm². By securing such a tensile rupture strength, excellent moldability can be further effectively imparted.

While in the aluminum foil, the tensile rupture strength when a tensile test is conducted in a perpendicular direction (TD) and a 45° direction with respect to a rolling direction is not particularly limited, the tensile rupture strength is, for example, 90 to 124 N/mm², preferably 94 to 122 N/mm², further preferably 96 to 105 N/mm².

The above-mentioned 0.2% yield strength, tensile rupture strength and tensile rupture elongation are values measured by a tensile test defined in JIS Z 2241.

The aluminum foil used as the metal layer 3 may be pure aluminum alone as long as it has a 0.2% yield strength as described above, but the aluminum foil is preferably an aluminum alloy. Examples of the aluminum alloy used for the aluminum foil include aluminum-Fe-based alloys and aluminum-Mn-based alloys, with aluminum-Fe-based alloys being preferred. Preferred examples of the aluminum foil used as the metal layer 3 include soft aluminum, for example annealed aluminum (JIS A8021H-O) or (JIS A8079H-O).

Aluminum foils having the above-mentioned characteristics are publicly known, and methods for production thereof are also publicly known. Specifically, an aluminum foil having such characteristics can be produced by passing through, for example, a step of homogenizing an aluminum metal or aluminum alloy at about 500 to 600° C. for about 1 to 2 hours, a step of hot-rolling the aluminum metal or aluminum alloy at about 400 to 500° C., a step of cold-rolling the aluminum metal or aluminum alloy, a step of intermediate-annealing the aluminum metal or aluminum alloy at about 300 to 450° C. for about 1 to 10 hours, cold-rolling the aluminum metal or aluminum alloy and final-annealing the aluminum metal or aluminum alloy at about 250 to 400° C. for about 30 to 100 hours.

The thickness of the base metal layer 3 is, for example, 20 to 50 μm, preferably 30 to 40 μm.

Preferably, at least one surface, preferably both surfaces, of the metal layer 3 is subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer composed of repeating units represented by the following general formulae (1) to (4).

[Chemical Formula 1]

(1)

[Chemical Formula 2]

(2)

[Chemical Formula 3]

(3)

[Chemical Formula 4]

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxy alkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer composed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

The chemical conversion treatment may be performed with one chemical conversion treatment alone, or may be performed in combination of two or more chemical conversion treatments. The chemical conversion treatment may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistance film to be formed on the surface of the metal layer 3 in the chemical conversion treatment is not particularly limited, but for example when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorous compound be contained in an amount of about 0.5 mg to about 50 mg, preferably about 1.0 to about 40 mg, in terms of phosphorous, and the aminated phenol polymer be contained in an amount of about 1 mg to 200 mg, preferably about 5.0 mg to about 150 mg, per 1 $m^2$ of the surface of the metal layer.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70 to 200° C. The metal layer may be subjected to a degreasing treatment by an alkali immersion method, an electrolytic cleaning method, an acid cleaning method, an electrolytic cleaning or the like before the metal layer is subjected to a chemical conversion treatment. When a degreasing treatment is performed as described above, the chemical conversion treatment of the surface of the metal layer can be further efficiently performed.

[Sealant Layer 4]

In the packaging material for a cell according to the present invention, the sealant layer 4 corresponds to an innermost layer, and at the time of assembling a cell, the sealant layer is heat-sealed with itself to hermetically seal the cell element.

While the resin component used for the sealant layer 4 is not particularly limited as long as heat sealing is possible, examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by copolymerizing a monomer that forms a cyclic polyolefin, with the monomer partially replaced by an $\alpha,\beta$-unsaturated carboxylic acid or an anhydride thereof, or block-polymerizing or graft-polymerizing an $\alpha,\beta$-unsaturated carboxylic acid or an anhydride thereof with a cyclic polyolefin. Cyclic polyolefins that are modified with a carboxylic acid are similar to the cyclic polyolefins described above. Carboxylic acids to be used for modification are similar to those to be used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer including a combination of two or more resin components. Further, the sealant layer 4 may be formed of only one layer, but may be formed of two or more layers with the same resin component or different resin components.

While the thickness of the sealant layer 4 can be appropriately selected, the thickness is 10 to 100 µm, preferably 15 to 50 µm.

[Adhesive Layer 5]

In the packaging material for a cell according to the present invention, the adhesive layer 5 is a layer provided between the metal layer 3 and the sealant layer 4 as necessary for strongly bonding these layers.

The adhesive layer 5 is formed from an adhesive capable of bonding the metal layer 3 and the sealant layer 4. For the adhesive to be used for formation of the adhesive layer 5, the adhesion mechanism, the type of adhesive component and the like thereof are similar to those in the adhesive layer 2. The adhesive component to be used for the adhesive layer 5 is preferably a polyolefin-based resin, further preferably a carboxylic acid-modified polyolefin, especially preferably carboxylic acid-modified polypropylene.

The thickness of the base material layer 5 is, for example, 10 to 50 µm, preferably 20 to 30 µm.

3. Method for Producing Packaging Material for Cell

While the method for producing a packaging material for a cell according to the present invention is not particularly limited as long as a laminate in which layers each having a predetermined composition are laminated is obtained, for example the following method is shown as an example.

First, a laminate with the base material layer 1, the adhesive layer 2 and the metal layer 3 laminated in this order (hereinafter, the laminate may be described as a "laminate A") is formed. Specifically, the laminate A can be formed by a dry lamination method in which an adhesive to be used for formation of the adhesive layer 2 is applied onto the base material layer 1 or the metal layer 3, the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mention is made of, for example, (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive for formation of the adhesive layer 5 is laminated on the metal layer 3 of the laminate A by an extrusion method or a method in which the adhesive is applied by solution coating, dried at a high temperature and baked, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination).

A laminate including the base material layer 1, the adhesive layer 2, the metal layer 3, the surface of which is subjected to a chemical conversion treatment as necessary, the adhesive layer 5 provided as necessary and the sealant layer 4 in this order is formed in the manner described above, and the laminate may be further subjected to a heating treatment of heat roll contact type, hot air type, near- or far-infrared type or the like for strengthening adhesion of the adhesive layer 2 and the adhesive layer 5 provided as necessary. For example, this heating treatment is performed under conditions of 150 to 250° C. for 1 to 5 minutes.

In the packaging material for a cell according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Packaging Material for Cell

The packaging material for a cell according to the present invention is used as a packaging material for hermetically sealing and storing cell elements such as a positive electrode, a negative electrode and an electrolyte.

Specifically, a cell element including at least a positive electrode, a negative electrode and an electrolyte is covered with the packaging material for a cell according to the present invention such that a flange portion (region where a sealant layer is in contact with itself) can be formed on the periphery of the cell element while a metal terminal connected to each of the positive electrode and the negative electrode protrudes to outside, and the sealant layer at the flange portion is heat-sealed to itself to hermetically seal the cell element, thereby providing a cell using a packaging material for a cell. When the cell element is stored using the packaging material for a cell according to the present invention, the packaging material for a cell according to the present invention is used such that the sealant portion of the packaging material is on the inner side (surface in contact with the cell element).

The packaging material for a cell according to the present invention may be used for either a primary battery or a secondary battery, but is preferably used for a secondary battery. The type of secondary battery to which the packaging material for a cell according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred objects to which the packaging material for a cell according to the present invention is applied include lithium ion batteries and lithium ion polymer batteries.

EXAMPLES

The present invention will be described in detail below by showing examples and comparative examples. It is to be noted that the present invention is not limited to examples.

Examples 1 to 18 and Comparative Examples 1 to 3

Production of Packaging Material for Cell

An adhesive layer 5 and a sealant layer 4 were laminated to a laminate with a base material layer 1, an adhesive layer 2 and a metal layer 3 laminated in this order using a thermal lamination method, thereby producing a packaging material for a cell including a laminate with the base material layer 1, the adhesive layer 2, the metal layer 3, the adhesive layer 5 and the sealant layer 4 laminated in this order. Conditions for production of the packaging material for a cell are as follows.

As a resin film to form the base material layer 1, the following nylon films 1, 2 and 3 were used.

Nylon Film 1

Biaxially stretched nylon film: nylon 6

Thickness: 25 μm

Elongation in perpendicular direction (TD) ($EL_{TD}$): 110%

Elongation in flow direction (MD) ($EL_{MD}$): 1.40%

$EL_{MD}/EL_{TD}$ ratio: 1.28

Tensile strength in perpendicular direction (TD) ($TS_{TD}$): 270 MPa

Tensile strength in flow direction (MD) ($TS_{MD}$): 260 MPa $TS_{MD}/TS_{TD}$ ratio: 0.96

Nylon Film 2

Biaxially stretched nylon film: nylon 6

Thickness: 25 m

Elongation in perpendicular direction (TD) ($EL_{TD}$): 100%

Elongation in flow direction (MD) ($EL_{MD}$): 110%

$EL_{MD}/EL_{TD}$ ratio: 1.10

Tensile strength in perpendicular direction (TD) ($TS_{TD}$): 350 MPa

Tensile strength in flow direction (MD) ($TS_{MD}$): 330 MPa $TS_{MD}/TS_{TD}$ ratio: 0.94

Nylon Film 3

Biaxially stretched nylon film: nylon 6

Thickness: 25 μm

Elongation in perpendicular direction (TD) ($EL_{TD}$): 100%

Elongation in flow direction (MD) ($EL_{MD}$): 120%

$EL_{MD}/EL_{TD}$ ratio: 1.20

Tensile strength in perpendicular direction (TD) ($TS_{TD}$): 300 MPa

Tensile strength in flow direction (MD) ($TS_{MD}$): 270 MPa $TS_{MD}/TS_{TD}$ ratio: 0.90

The nylon films 1, 2 and 3 were produced by simultaneously biaxially stretching an unstretched raw film composed of a raw material including a nylon using a tubular method under such conditions that the draw ratio in each of the flow direction (MD) and the width direction (TD) was 3.0 to 3.5, and then heat-treating the film at 150 to 200° C.

The elongation ($EL_{TD}$), the elongation ($EL_{MD}$), the tensile strength ($TS_{TD}$) and the tensile strength ($TS_{MD}$) of each of the nylon films 1, 2 and 3 were measured by a tensile test set at a sample width of 15 mm, a gauge length of 100 mm and a tension speed of 500 mm/min using a precise universal tester (autograph).

As an aluminum foil to form the metal layer 3, one obtained by subjecting to a chemical conversion treatment both the surfaces of each of AL foils 1 to 9 (thickness: 40 m) composed of soft aluminum (JIS H4160 A8021H-O) and having physical properties shown in Table 1 was used. The chemical conversion treatment of AL foils 1 to 9 was performed by applying to both the surfaces of the metal layer a treatment liquid including a phenol resin, a chromium fluoride compound and phosphoric acid using a roll coating method, and performing baking for 20 seconds under such conditions that the film temperature was 180° C. or higher.

TABLE 1

|  | 0.2% yield strength [N/mm²] | | | Tensile rupture strength [N/mm³] | | | Tensile rupture elongation [%] | | |
| --- | --- | --- | --- | --- | --- | --- | --- | --- | --- |
|  | MD direction | TD direction | 45° direction | MD direction | TD direction | 45° direction | MD direction | TD direction | 45° direction |
| AL foil 1 | 58 | 62 | 60 | 100 | 99 | 102 | 12 | 13 | 19 |
| AL foil 2 | 64 | 62 | 63 | 107 | 101 | 103 | 12 | 11 | 12 |
| AL foil 3 | 66 | 67 | 67 | 105 | 96 | 98 | 13 | 12 | 16 |
| AL foil 4 | 75 | 75 | 72 | 102 | 98 | 96 | 10 | 10 | 14 |
| AL foil 5 | 85 | 82 | 80 | 110 | 101 | 99 | 12 | 11 | 20 |
| AL foil 6 | 121 | 117 | 112 | 123 | 122 | 117 | 7 | 3 | 9 |
| AL foil 7 | 41 | 40 | 41 | 90 | 89 | 93 | 12 | 11 | 18 |
| AL foil 8 | 38 | 36 | 38 | 94 | 88 | 92 | 21 | 19 | 23 |
| AL foil 9 | 148 | 144 | 144 | 133 | 130 | 125 | 4 | 3 | 7 |

AL foils 1 to 6 were produced by passing through a step of homogenizing an aluminum alloy at about 500 to 600° C. for about 1 to 2 hours, a step of hot-rolling the aluminum alloy at about 400 to 500° C., a step of cold-rolling the aluminum alloy, a step of intermediate-annealing the aluminum alloy at about 300 to 450° C. for about 1 to 10 hours, cold-rolling the aluminum alloy and final-annealing the aluminum alloy at about 250 to 400° C. for about 30 to 100 hours.

The 0.2% yield strength, the tensile rupture elongation and the tensile rupture elongation of each of the AL foils 1 to 9 were measured by a tensile test defined in JIS Z 2241.

First, a laminate with the base material layer 1, the adhesive layer 2 and the metal layer 3 laminated in this order was prepared using the combination of the base material layer 1 and the metal layer 3 shown in Table 2. Specifically, on one surface of the base material layer 1, the adhesive layer 2 composed of a two-liquid urethane adhesive of a polyester-based main agent and an isocyanate-based curing agent was formed in a thickness of 3 μm, and the adhesive layer 2 was bonded to the chemical conversion-treated surface of the metal layer under pressure and heating to prepare a laminate with the base material layer 1, the adhesive layer 2 and the metal layer 3 laminated in this order.

Separately, an acid-modified polypropylene resin [unsaturated carboxylic acid graft-modified random polypropylene graft-modified with an unsaturated carboxylic acid] to form the adhesive layer 5 and polypropylene [random copolymer (hereinafter, referred to PP)] to form the sealant layer 4 were co-extruded to prepare a bilayer co-extruded film composed of the adhesive layer 5 having a thickness of 20 μm and the sealant layer 4 having a thickness of 20 μm.

Then, the prepared laminate composed of the base material layer 1, the adhesive layer 2 and the metal layer 3 and the prepared bilayer co-extruded film were superimposed on each other with the adhesive layer 5 of the bilayer co-extruded film being in contact with the metal layer of the laminate, and thermal-laminated by performing heating so that the metal layer 3 had a temperature of 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and kept at this temperature for 1 minute to be heat-treated, thereby obtaining a packaging material for a cell.

TABLE 2

| | Type of base material layer 1 | Type of metal layer 3 |
| --- | --- | --- |
| Example 1 | Nylon Film 1 | AL foil 1 |
| Example 2 | Nylon Film 1 | AL foil 2 |
| Example 3 | Nylon Film 1 | AL foil 3 |
| Example 4 | Nylon Film 1 | AL foil 4 |
| Example 5 | Nylon Film 1 | AL foil 5 |
| Example 6 | Nylon Film 1 | AL foil 6 |
| Example 7 | Nylon Film 2 | AL foil 1 |
| Example 8 | Nylon Film 2 | AL foil 2 |
| Example 9 | Nylon Film 2 | AL foil 3 |
| Example 10 | Nylon Film 2 | AL foil 4 |
| Example 11 | Nylon Film 2 | AL foil 5 |
| Example 12 | Nylon Film 2 | AL foil 6 |
| Example 13 | Nylon Film 3 | AL foil 1 |
| Example 14 | Nylon Film 3 | AL foil 2 |
| Example 15 | Nylon Film 3 | AL foil 3 |
| Example 16 | Nylon Film 3 | AL foil 4 |
| Example 17 | Nylon Film 3 | AL foil 5 |
| Example 18 | Nylon Film 3 | AL foil 6 |
| Comparative Example 1 | Nylon Film 1 | AL foil 7 |
| Comparative Example 2 | Nylon Film 1 | AL foil 8 |
| Comparative Example 3 | Nylon Film 1 | AL foil 9 |

<Evaluation of Moldability>

The obtained packaging material for a cell was cut to prepare a strip of 120×80 mm, and the strip was used as a test sample. A straight mold including a rectangular male mold of 30×50 mm and a female mold having a clearance of 0.5 mm with the male mold was provided, the test sample was placed on the female mold such that the heat-bonding resin layer side was situated on the male mold side, and cold molding (draw-in single stage molding) was performed with the test sample pressed under a pressing force (contact pressure) of 0.1 MPa so as to have a molding depth of 6 mm or 7 mm. Molding under conditions corresponding to a molding depth of 6 mm was performed using the packaging materials for a cell in Examples 1 to 6 and Comparative Examples 1 to 3, and molding under conditions corresponding to a molding depth of 7 mm was performed using the packaging materials for a cell in Examples 1 to 18. Whether or not pinholes and cracks were generated in the metal layer in the molded packaging material for a cell was checked, and an incidence (%) of pinholes and cracks was calculated. A packaging material found to have one or more pinholes or cracks after performing the molding was judged to be a defective molding, and the incidence of pinholes and cracks was determined as a ratio of defective moldings occurring when 30 test samples were molded under the above-mentioned conditions.

Results of molding performed under conditions corresponding to a molding depth of 6 mm are shown in Table 3, and results of molding performed under conditions corresponding to a molding depth of 7 mm are shown in Table 4.

As is evident from Table 3, in a packaging material for a cell including as a metal layer an aluminum foil having a high yield strength with the 0.2% yield strength being 58 to 121 N/mm$^2$, particularly 64 to 85 N/mm$^2$ in a parallel direction with respect to a rolling direction, generation of pinholes and cracks could be remarkably suppressed when molding was performed with a molding depth of 6 mm (Examples 1 to 6). On the other hand, in the case where an aluminum foil having a 0.2% yield strength of less than 58 N/mm$^2$ or more than 121 N/mm$^2$ in a parallel direction with respect to a rolling direction was used, the incidence of pinholes and cracks was high when molding was performed with a molding depth of 6 mm, leading to poorer moldability as compared to Examples 1 to 6.

As is evident from Table 4, it was also confirmed when molding was performed under the severe condition of a molding depth of 7 mm, the incidence of pinholes and cracks could be exceptionally reduced by employing nylon films 2 and 3 as the base material layer.

TABLE 3

Results of molding performed under condition of molding depth of 6 mm

| | Base material layer 1 | Metal layer 2 | 0.2% yield strength in MD direction [N/mm$^2$] | Tensile rupture strength in MD direction [N/mm$^2$] | Tensile rupture elongation in MD direction [%] | Incidence (%) of pinholes and cracks |
|---|---|---|---|---|---|---|
| Example 1 | Nylon Film 1 | AL foil 1 | 58 | 100 | 12 | 5 |
| Example 2 | Nylon Film 1 | AL foil 2 | 64 | 107 | 12 | 0 |
| Example 3 | Nylon Film 1 | AL foil 3 | 66 | 105 | 13 | 0 |
| Example 4 | Nylon Film 1 | AL foil 4 | 75 | 102 | 10 | 0 |
| Example 5 | Nylon Film 1 | AL foil 5 | 85 | 110 | 12 | 0 |
| Example 6 | Nylon Film 1 | AL foil 6 | 121 | 123 | 7 | 3 |
| Comparative Example 1 | Nylon Film 1 | AL foil 7 | 41 | 90 | 12 | 17 |
| Comparative Example 2 | Nylon Film 1 | AL foil 8 | 38 | 94 | 21 | 28 |
| Comparative Example 3 | Nylon Film 1 | AL foil 9 | 148 | 133 | 4 | 33 |

TABLE 4

Results of molding performed under condition of molding depth of 7 mm

| | Base material layer 1 | Metal layer 2 | 0.2% yield strength in MD direction [N/mm$^2$] | Tensile rupture strength in MD direction [N/mm$^2$] | Tensile rupture elongation in MD direction [%] | Incidence (%) of pinholes and cracks |
|---|---|---|---|---|---|---|
| Example 1 | Nylon Film 1 | AL foil 1 | 58 | 100 | 12 | 56 |
| Example 2 | Nylon Film 1 | AL foil 2 | 64 | 107 | 12 | 30 |
| Example 3 | Nylon Film 1 | AL foil 3 | 66 | 105 | 13 | 10 |
| Example 4 | Nylon Film 1 | AL foil 4 | 75 | 102 | 10 | 8 |
| Example 5 | Nylon Film 1 | AL foil 5 | 85 | 110 | 12 | 12 |
| Example 6 | Nylon Film 1 | AL foil 6 | 121 | 123 | 7 | 43 |
| Example 7 | Nylon Film 2 | AL foil 1 | 58 | 100 | 12 | 9 |
| Example 8 | Nylon Film 2 | AL foil 2 | 64 | 107 | 12 | 2 |
| Example 9 | Nylon Film 2 | AL foil 3 | 66 | 105 | 13 | 0 |
| Example 10 | Nylon Film 2 | AL foil 4 | 75 | 102 | 10 | 0 |
| Example 11 | Nylon Film 2 | AL foil 5 | 85 | 110 | 12 | 0 |
| Example 12 | Nylon Film 2 | AL foil 6 | 121 | 123 | 7 | 3 |
| Example 13 | Nylon Film 3 | AL foil 1 | 58 | 100 | 12 | 10 |
| Example 14 | Nylon Film 3 | AL foil 2 | 64 | 107 | 12 | 5 |
| Example 15 | Nylon Film 3 | AL foil 3 | 66 | 105 | 13 | 0 |
| Example 16 | Nylon Film 3 | AL foil 4 | 75 | 102 | 10 | 0 |
| Example 17 | Nylon Film 3 | AL foil 5 | 85 | 110 | 12 | 0 |
| Example 18 | Nylon Film 3 | AL foil 6 | 121 | 123 | 7 | 4 |

DESCRIPTION OF REFERENCE SIGNS

1: Base material layer
2: Adhesive Layer
3: Metal layer
4: Sealant layer
5: Adhesive Layer

The invention claimed is:

1. A packaging material for a cell including a laminate with at least a base material layer, an adhesive layer, a metal layer and a sealant layer laminated in this order,
   wherein the metal layer is an aluminum foil having a 0.2% yield strength of 64 to 85 N/mm$^2$ when a tensile test is conducted in a parallel direction with respect to a rolling direction,
   wherein the aluminum foil satisfies a tensile rupture strength of 102 to 110 N/mm$^2$ when a tensile test is conducted in a parallel direction with respect to a rolling direction, and
   wherein the aluminum foil satisfies a tensile rupture elongation of 10 to 13% when a tensile test is conducted in a parallel direction with respect to a rolling direction.

2. The packaging material for a cell according to claim 1, wherein the base material layer is a biaxially stretched nylon film that satisfies the following physical properties (i) and (ii):
   (i) the elongation in the width direction ($EL_{TD}$) is 80 to 120%, and the ratio of the elongation in the flow direction ($EL_{MD}$) to the elongation in the width direction ($EL_{TD}$) ($EL_{MD}/EL_{TD}$) is 1 to 1.25; and
   (ii) the tensile strength in the width direction ($TS_{TD}$) is 280 MPa or more, and the ratio of the tensile strength in the flow direction ($TS_{MD}$) to the tensile strength in the perpendicular direction ($TS_{TD}$) ($TS_{MD}/TS_{TD}$) is 0.75 to 1.

3. The packaging material for a cell according to claim 1, wherein the aluminum foil satisfies a 0.2% yield strength of 50 to 130 N/mm$^2$ when a tensile test is conducted in a perpendicular direction and a 45° direction with respect to a rolling direction.

4. The packaging material for a cell according to claim 1, wherein at least one of the surfaces of the metal layer is subjected to a chemical conversion treatment.

5. The packaging material for a cell according to claim 1, wherein the packaging material is a packaging material for a secondary battery.

6. A cell, wherein a cell element including at least a positive electrode, a negative electrode and an electrolyte is stored in the packaging material for a cell according to claim 1.

7. The packaging material for a cell according to claim 3, wherein the aluminum foil metal layer has a 0.2% yield strength of 60 to 90 N/mm$^2$ when the tensile test is conducted in the perpendicular direction and the 45° direction with respect to the rolling direction.

8. The packaging material for a cell according to claim 7, wherein the aluminum foil metal layer has a 0.2% yield strength of 65 to 85 N/mm$^2$ when the tensile test is conducted in the perpendicular direction and the 45° direction with respect to the rolling direction.

9. The packaging material for a cell according to claim 2, wherein the biaxially stretched nylon film satisfies the following properties (i) and (ii):
   (i) the elongation in the width direction ($EL_{TD}$) is 90 to 110%, and the ratio of the elongation in the flow direction ($EL_{MS}$) to the elongation in the width direction ($EL_{TD}$) ($EL_{MS}/EL_T$) is 1 to 1.2; and
   (ii) the tensile strength in the width direction ($TS_{TD}$) is 280 MPa to 370 MPa, and the ratio of the tensile strength in the flow direction ($TS_{MD}$) to the tensile strength in the perpendicular direction ($TS_{TD}$) ($TS_{MD}/TS_{TD}$) is 0.8 to 1.

10. The packaging material for a cell according to claim 9, wherein the biaxially stretched nylon film satisfies the following properties (i) and (ii):
    (i) the elongation in the width direction ($EL_{TD}$) is 95 to 100%, and the ratio of the elongation in the flow direction ($EL_{MD}$) to the elongation in the width direction ($EL_{TD}$) ($EL_{MD}/EL_{TD}$) is 1 to 1.2; and
    (ii) the tensile strength in the width direction ($TS_{TD}$) is 290 MPa to 350 MPa, and the ratio of the tensile strength in the flow direction ($TS_{MD}$) to the tensile strength in the perpendicular direction ($TS_{TD}$) ($TS_{MD}/TS_{TD}$) is 0.9 to 1.

11. The packaging material for a cell according to claim 1, wherein the aluminum foil satisfies a tensile rupture strength of 90 to 124 N/mm$^2$ when a tensile test is conducted in a perpendicular direction and a 45° direction with respect to the rolling direction.

12. The packaging material for a cell according to claim 11, wherein the aluminum foil satisfies the tensile rupture strength of 94 to 122 N/mm$^2$ when the tensile test is conducted in the perpendicular direction and the 45° direction with respect to the rolling direction.

13. The packaging material for a cell according to claim 12, wherein the aluminum foil satisfies the tensile rupture strength of 96 to 105 N/mm$^2$ when the tensile test is conducted in the perpendicular direction and the 45° direction with respect to the rolling direction.

14. A packaging material for a cell including a laminate, the laminate comprising:
    a base material layer including a biaxially stretched nylon film that satisfies the following physical properties (i) and (ii):
    (i) the elongation in the width direction ($EL_{TD}$) is 80 to 120%, and the ratio of the elongation in the flow direction ($EL_{MD}$) to the elongation in the width direction ($EL_{TD}$) ($EL_{MD}/EL_{TD}$) is 1 to 1.25; and
    (ii) the tensile strength in the width direction ($TS_{TD}$) is 280 MPa or more, and the ratio of the tensile strength in the flow direction ($TS_{MD}$) to the tensile strength in the perpendicular direction ($TS_{TD}$) ($TS_{MD}/TS_{TD}$) is 0.75 to 1;
    an adhesive layer laminated over the base material layer;
    a metal layer laminated over the adhesive layer, the metal layer including an aluminum foil having:
    a 0.2% yield strength of 64 to 85 N/mm$^2$ when a tensile test is conducted in a parallel direction with respect to a rolling direction;
    a 0.2% yield strength of 50 to 130 N/mm$^2$ when a tensile test is conducted in a perpendicular direction and a 45° direction with respect to the rolling direction;
    a tensile rupture strength of 102 to 110 N/mm$^2$ when a tensile test is conducted in the parallel direction with respect to the rolling direction;
    a tensile rupture strength of 90 to 124 N/mm$^2$ when a tensile test is conducted in the perpendicular direction and the 45° direction with respect to the rolling direction;

a tensile rupture elongation of 10 to 13% when a tensile test is conducted in the parallel direction with respect to the rolling direction; and a sealant layer laminated over the metal layer.

15. The packaging material for a cell according to claim 14, wherein:

for the base material layer property (i), the elongation in the width direction ($EL_{TD}$) is 90 to 110%, and the ratio of the elongation in the flow direction ($EL_{MD}$) to the elongation in the width direction ($EL_{TD}$) ($EL_{MD}/EL_{TD}$) is 1.0 to 1.25;

for the base material layer property (ii), the tensile strength in the width direction ($TS_{TD}$) is 280 MPa to 370 MPa, and the ratio of the tensile strength in the flow direction ($TS_{MD}$) to the tensile strength in the perpendicular direction ($TS_{TD}$) ($TS_{MD}/TS_{TD}$) is 0.8 to 1.0; and the metal layer satisfies:

a 0.2% yield strength of 60 to 90 N/mm$^2$ when a tensile test is conducted in the perpendicular direction and the 45° direction with respect to the rolling direction; and a tensile rupture strength of 94 to 122 N/mm$^2$ when a tensile test is conducted in the perpendicular direction and the 45° direction with respect to the rolling direction.

16. The packaging material for a cell according to claim 15, wherein:

for the base material layer property (i), the elongation in the width direction ($EL_{TD}$) is 95 to 100%, and the ratio of the elongation in the flow direction ($EL_{MD}$) to the elongation in the width direction ($EL_{TD}$) ($EL_{MD}/EL_{TD}$) is 1.0 to 1.2;

for the base material layer property (ii), the tensile strength in the width direction ($TS_{TD}$) is 290 MPa to 350 MPa, and the ratio of the tensile strength in the flow direction ($TS_{MD}$) to the tensile strength in the perpendicular direction ($TS_{TD}$) ($TS_{MD}/TS_{TD}$) is 0.9 to 1.0; and the metal layer satisfies:

a 0.2% yield strength of 65 to 85 N/mm$^2$ when a tensile test is conducted in the perpendicular direction and the 45° direction with respect to the rolling direction; and a tensile rupture strength of 96 to 105 N/mm$^2$ when a tensile test is conducted in the perpendicular direction and the 45° direction with respect to the rolling direction.

* * * * *